US008692801B2

(12) United States Patent
Luo et al.

(10) Patent No.: US 8,692,801 B2
(45) Date of Patent: Apr. 8, 2014

(54) SYSTEM AND METHOD FOR SPARSE TOUCH SENSING ON CAPACITIVE TOUCH SCREEN

(75) Inventors: Chenchi Luo, Atlanta, GA (US); Milind Anil Borkar, Dallas, TX (US); Arthur John Redfern, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 183 days.

(21) Appl. No.: 13/432,576

(22) Filed: Mar. 28, 2012

(65) Prior Publication Data
US 2013/0257783 A1  Oct. 3, 2013

(51) Int. Cl.
*G06F 3/045* (2006.01)
*G06F 3/041* (2006.01)

(52) U.S. Cl.
USPC .......................................... 345/174; 345/173

(58) Field of Classification Search
USPC .................................. 345/173, 174
See application file for complete search history.

(56) References Cited

U.S. PATENT DOCUMENTS

| 2006/0279570 | A1* | 12/2006 | Zhou et al. ..................... 345/426 |
| 2008/0158198 | A1* | 7/2008 | Elias ............................. 345/174 |
| 2009/0273579 | A1 | 11/2009 | Zachut et al. |
| 2011/0279412 | A1 | 11/2011 | Chen et al. |

OTHER PUBLICATIONS

Barret, G. and Omote, R., "Projected-Capacitive Touch Technology," Information Display, vol. 26, No. 3, pp. 16-21, Mar. 2010.

Philipp, H., "Charge Transfer Sensing," Sensor Review, vol. 13, No. 11, pp. 96-105, May 1999.
Candes, E.J. and Tao, T., "Near-Optimal Signal Recovery From Random Projections: Universal Encoding Strategies?," Information Theory, IEEE Transactions on, vol. 52, No. 12, pp. 5406-5425, Dec. 2006.
Rauhut, Holger, "Circulant and Toeplitz Matrices in Compressed Sensing," in SPARS '09—Signal Processing With Adaptive Sparse Structured Representations, Remi Gribonval, Ed., Saint Malo, France, 2009, Inria Rennes—Bretagne Atlantique.
Aharon, M.; Elad, M.; and Bruckstein, A., "K-svd: An Algorithm for Designing Overcomplete Dictionaries for Sparse Representation," Signal Processing, IEEE Transactions on, vol. 54, No. 11, pp. 4311-4322, Nov. 2006.
Elad, M., "Optimized Projections for Compressed Sensing," Signal Processing, IEEE Transactions on, vol. 55, No. 12, pp. 5695-5702, Dec. 2007.
Grant, M.; Boyd S., "CVX: Matlab Software for Disciplined Convex Programming, Version 1.21," http://cvxr.com/cvx, Apr. 2011.

(Continued)

*Primary Examiner* — Aneeta Yodichkas
(74) *Attorney, Agent, or Firm* — John R. Pessetto; Wade J. Brady, III; Frederick J. Telecky, Jr.

(57) ABSTRACT

An embodiment of the invention provides a method of detecting the position(s) where sensor(s) are activated on an interactive screen using sparse-activation compressive sensing. Sparse-activation compressive sensing makes use of the situation where the number of simultaneously activated sensors is substantially smaller than the number of sensors (nodes). Because the number of simultaneously activated sensors is substantially smaller than the number of sensors, the number of measurements required for determining which sensors are activated may also be reduced. Because fewer measurements are required when compared with full-scan techniques, less circuitry and power is required to detect the location(s) of activated sensors on an interactive screen.

2 Claims, 5 Drawing Sheets

(56) References Cited

OTHER PUBLICATIONS

Needell, D.; Tropp, J. and Vershynin, R., "Greedy Signal Recovery Review," in Signals, Systems and Computers, 2008 42nd Asilomar Conference on, Oct. 2008, pp. 1048-1050.

Bruckstein, A.M.; Elad, M., and Zibulevsky, M., "On the Uniqueness of Nonnegative Sparse Solutions to Underdetermined Systems of Equations," Information Theory, IEEE Transactions on, vol. 54, No. 11, pp. 4813-4820, Nov. 2008.

Baraniuk, R.G.; Cevher, V.; Duarte, M.F.; and Hegde, C., "Model-Based Compressive Sensing," Information Theory, IEEE Transactions on, vol. 56, No. 4, pp. 1982-2001, Apr. 2010.

Wakin, Michael B.; Laska, Jason N.; Duarte, Marco F.; Baron, Dror; Sarvotham, Shriram; Takhar, Dharmpal; Kelly, Kevin F.; and Baraniuk, Richard G., "An Architecture for Compressive Imaging," in IEEE International Conference on Image Processing, 2006, pp. 1273-1276.

Deanna Needell et al. 'CoSaMP: Iterative Signal Recovery from Incomplete and Inaccurate Samples.' Communications of the ACM. Dec. 2010. pp. 93-100, see p. 95, right column, lines 12-48. vol. 53, Issue 12.

Qing Ling et al. 'Decentralized Sparse Signal Recover for Compressive Sleeping Wireless Sensor Networks.' IEEE Transactions on Signal Processing. Jul. 2010. pp. 3816-3827, see p. 3816, left column, lines 1-4; p. 3817, right column, lines 53-54. vol. 58, No. 7.

\* cited by examiner

AN EXAMPLE OF SPARSE NATURE OF TOUCHES

ALTERNATIVE CHARGE TRANSFER CIRCUIT

A LARGE SPACED COLUMN-WISE
SPARCE TOUCH RECOVERY EXAMPLE

SYSTEM AND METHOD FOR SPARSE TOUCH SENSING ON CAPACITIVE TOUCH SCREEN

BACKGROUND

The popularity of interactive screens has been increasing since the introduction of smart phones and tablet PCs (personal computers). Interactive screens are becoming larger in size, and there is an increasing demand on the responsiveness, resolution and intelligence of these interactive screens. Generally, an interactive screen functions by scanning each sensor, often called a node, on the screen periodically to detect the location(s) where the sensor has been activated. A sensor may be activated by direct physical contact by an object (e.g human finger or a stylus), by objects in proximity to a sensor or by stimulating a sensor from a distance.

The number of sensors activated on an interactive screen at a particular time is relatively small when compared to the number of sensors on the interactive screen. FIG. 3 shows an example of the sparse characteristics of contact made with an interactive screen. In the example shown in FIG. 3, capacitance changes on active nodes when fingers are in close proximity with the interactive screen. At locations on the interactive screen where fingers are not in close proximity with the interactive screen, the capacitance does not change.

One method of determining when sensors on an interactive screen are activated is to periodically scan all of the sensors on the screen to monitor which sensors have been activated and which sensors have not been activated. A full scan (i.e. scanning all of the sensors on the screen) may be time consuming and may consume more power than is necessary. Power consumption on portable electronic devices is critical because the amount of power may be limited. The amount of power used to drive an interactive screen may be reduced by reducing the sensing complexity of an interactive screen while maintaining the accuracy of the detection and localization of where sensors are activated.

DETAILED DESCRIPTION

Figure 1:
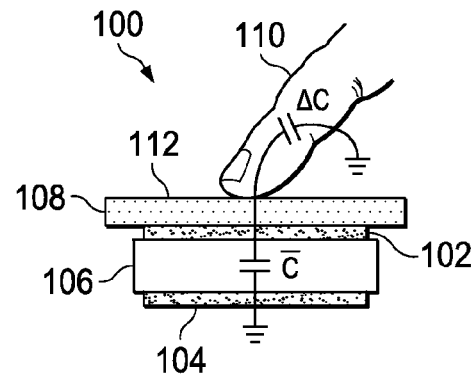
FIG. 1 is a diagram showing a cross-section of a sensor on a capacitive-touch screen along with capacitances on the capacitive-touch screen. (Prior Art)

The drawings and description, in general, disclose a method and apparatus for detecting the position(s) where sensor(s) are activated on an interactive screen using sparse-activation compressive sensing. Sparse-activation compressive sensing, in an embodiment of this invention, makes use of the situation where the number of simultaneously activated sensors (e.g. 10 or less per person) is substantially smaller than the number of sensors (nodes) (e.g. 100 s). Because the number of simultaneously activated sensors is substantially smaller than the number of sensors, the number of measurements required for determining which sensors are activated may also be reduced. Because fewer measurements are required when compared with full-scan techniques, less circuitry and power is required to detect the location(s) of activated sensors on an interactive screen.

An embodiment of the invention for determining where activated sensors on an interactive screen are located includes three steps. During a first step, the sensors in a column of N sensors are driven to initial states. The initial states are chosen to simplify the sparse-activation compressive sensing algorithm used as part of this embodiment. The states of the N sensors are a function of the initial state and interaction(s) they sense. Also during the first step, the outputs from the N sensors are combined into a single state. After the N sensors are summed into a single state, the single state is electronically stored.

During a second step of this embodiment of the invention, the first step is repeated K times. The number of times K the first step is repeated is substantially smaller than the number of sensors N. During a third step of this embodiment, the locations of where the sensors are activated on the interactive screen are determined using the K electronically stored single states and sparse-activation compressive sensing.

In another embodiment of the invention, voltage drivers pre-charge sensors (nodes) in a column to distinct voltages. After the sensors in the column have been pre-charged to distinct voltages $V_n$, the sensors are electrically connected in parallel and charge from these sensors is transferred to a reference capacitor $C_{ref}$. The charge on the reference capacitor $C_{ref}$ is converted to a sensed voltage $V_{sense}$ by a capacitance-to-voltage converter. The sensed voltage $V_{sense}$ is stored in a touch-screen controller. The process of 1) pre-charging the sensors in a column to voltage $V_n$, 2) connecting the sensors in parallel, 3) transferring charge from the sensors to a reference capacitor $C_{ref}$, 4) converting the charge on the reference capacitor $C_{ref}$ to a sensed voltage $V_{sense}$, and 5) storing the sensed voltage $V_{sense}$ in a touch-screen controller is repeated K times (where the value of K is significantly smaller than the number of sensors N−1) in order to create a linear equation where the change in capacitance of any of the sensors can be determined using sparse-activation compressive sensing.

The linear equation and sparse-activation compressing sensing along with other embodiments of the invention will be discussed in more detail later in the specification.

FIG. 1 is a diagram showing a cross-section of a sensor 112 on a capacitive-touch screen 100 along with capacitances on a capacitive-touch screen 100. Two layers of indium tin dioxide (ITO) electrodes 102 and 104 are laid over an LCD screen 108. A layer of dielectric material (e.g. plastic or pyrex glass) 106 is located between the two layers of electrodes 102 and 104.

Figure 2:
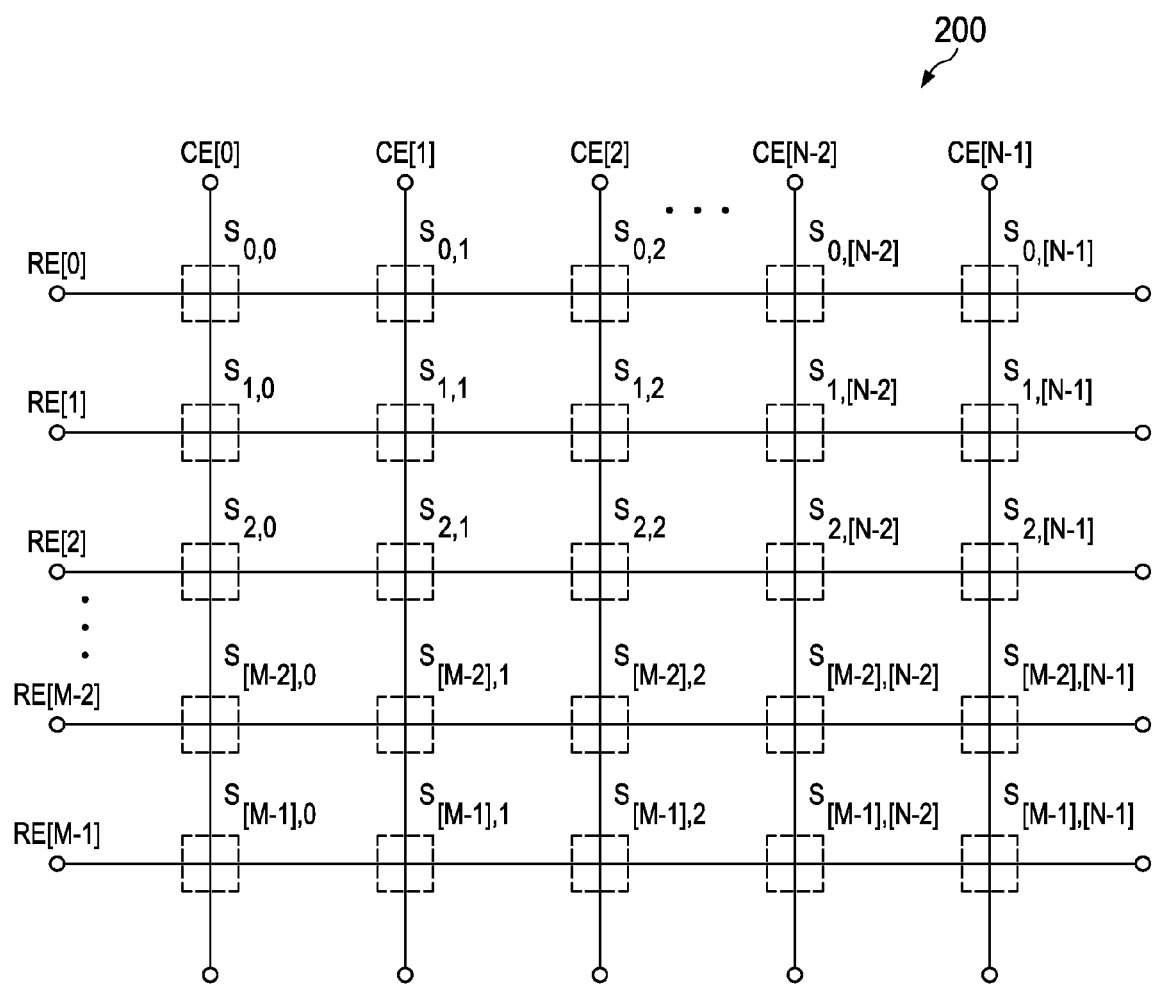
FIG. 2 is a layout of a capacitive-touch screen indicating the locations of the electrodes. (Prior Art)

Consider a capacitive-touch screen as show in FIG. 2 with M row electrodes RE[0]-RE[M−1] and N column electrodes CE[0]-CE[N−1]. The capacitive-touch screen shown in FIG. 2 has M×N capacitance sensors $S_{0,0}$-$S_{[M−1],[N−1]}$ (nodes) where each sensor has a parasitic capacitance $\overline{C}$ at the intersection of each column and row electrode. The intersection of each column and row electrode is denoted with a dashed square in FIG. 2. At the intersection of column and row electrodes, electrodes are not directly connected (i.e. they are not shorted to each other). A finger 110 (other objects other than a finger may be used such as a stylus) close to a sensor shunts a portion of the electrical field to ground, which is equivalent to adding a capacitance $\Delta C$ in parallel with $\overline{C}$. Therefore, the sensed capacitance on the node becomes:

$$C = \overline{C} + \Delta C. \quad \text{equ. 1)}$$

Each sensor $S_{0,0}$-$S_{[M−1],[N−1]}$ on the capacitive-touch screen 200 can be viewed as a pixel in an image. After calibrating $\overline{C}$ out of C, the remaining $\Delta C$ on each node effectively constitutes a two dimensional image of touches or contact made with the capacitive-touch screen 200. Touches may be detected as peaks in the image with properties such as finger size, shape, orientation and pressure as reflected in the shapes of the peaks. When there are a small number of fingers relative to the number of sensors on the capacitive-touch screen, the image is considered to be sparse. As a result of the image being sparse, sparse-activation compressive sensing techniques may be used to determine where on the capacitive-touch screen an object, such as a finger, is located.

Figure 3:
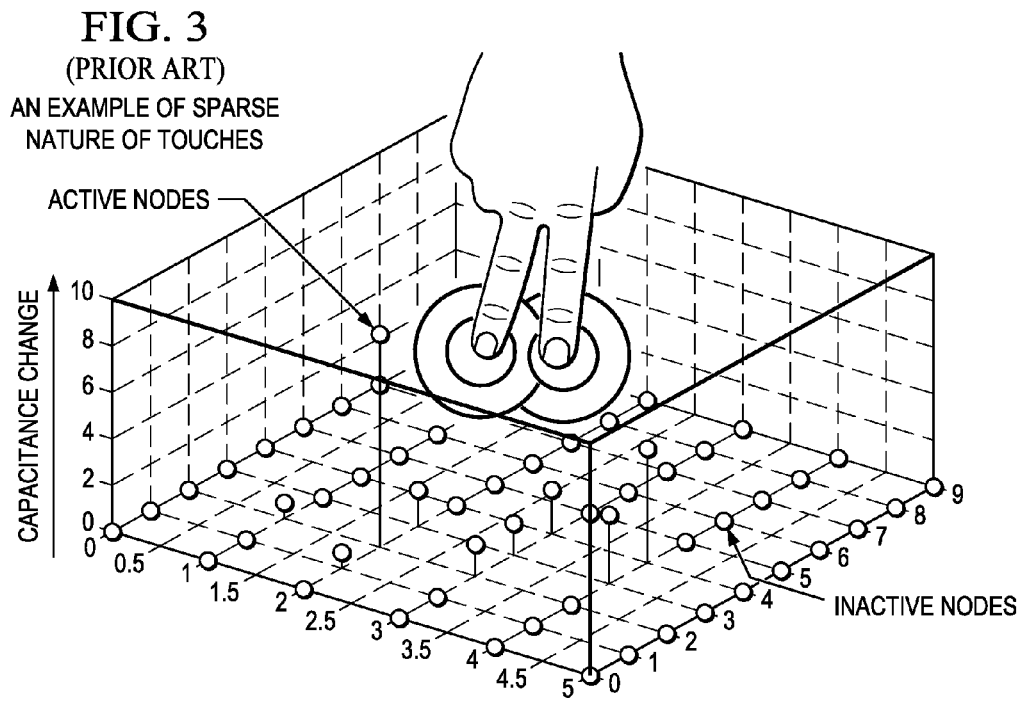
FIG. 3 is a graph of change in capacitance in a sensor as result of two fingers making contact with a capacitive-touch screen. (Prior Art)

FIG. 3 is a graph of change in capacitance on a sensor as result of two fingers making contact with a capacitive-touch screen. FIG. 3 illustrates that the capacitance of a sensor changes where contact is made with the two fingers (i.e. active nodes). In this example, the number of untouched sensors (i.e. inactive nodes) is significantly greater than the number of touched sensors (i.e. active nodes). Because the simultaneous touches on the capacitive-touch screen is sparse, the complexity of sensing the touches may be reduced while maintaining the accuracy of detection and localization.

Figure 4A:
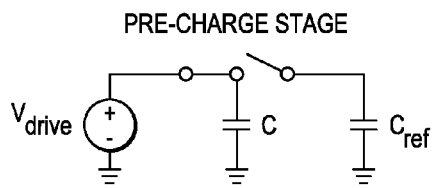
FIG. 4a is a schematic diagram of a voltage source charging a capacitor. (Prior Art)
Figure 4B:
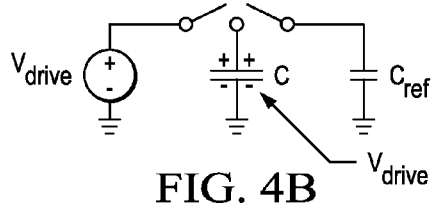
FIG. 4b is a schematic diagram of a charged capacitor and an uncharged capacitor. (Prior Art)
Figure 4C:
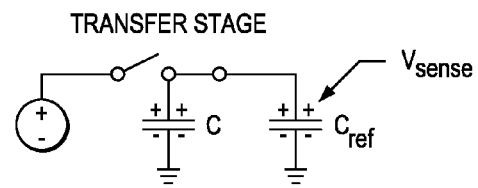
FIG. 4c is a schematic diagram of a charge being transferred from one capacitor to another capacitor. (Prior Art)

FIGS. 4a-4c are schematic diagrams of a charge transfer technique. As shown in FIGS. 4a-4c, the charge transfer is realized in two stages: the pre-charge stage and the transfer stage. In the pre-charge stage as shown in FIG. 4a, the capacitor C is charged with a known voltage source $V_{drive}$ such that in the steady state the charge Q is equal to $Q=(V_{drive} * C)$ as shown in FIG. 4b. In the transfer stage, FIG. 4c, a reference capacitor $C_{ref}$ is connected in parallel with C such that charge on C is transferred onto $C_{ref}$. The voltage on $C_{ref}$ is $V_{sense}$. According to law of conservation of total charge, we have:

$$V_{drive} * C = V_{sense}(C + C_{ref}) \quad \text{equ. 2)}$$

which can be rearranged as:

$$V_{sense} = C/(C + C_{ref}) * V_{drive} \quad \text{equ. 3)}$$

In this case because $C_{ref} \gg C$, we have:

$$V_{sense} = (C/C_{ref}) * V_{drive} \quad \text{equ. 4)}$$

Equation 4 makes it possible to estimate the capacitance of a sensor C as a proportional relationship between the drive voltage $V_{drive}$, the sense voltage $V_{sense}$ and reference capacitance $C_{ref}$. In this embodiment of the invention, this relationship is used, along with others, to determine where contact is made on a capacitive-touch screen.

Figure 5:
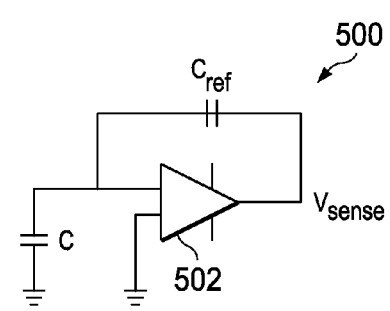
FIG. 5 is a schematic diagram of a charge transfer circuit. (Prior Art)

An alternative method for using charge transfer to determine the capacitance of a sensor is shown in FIG. 5. An operational amplifier 502 is utilized and the polarity of $V_{sense}$ is inverted. This method for using charge transfer to determine the capacitance of a sensor also provides a proportionality relationship between the drive voltage $V_{drive}$, the sense voltage $V_{sense}$ and capacitance C:

$$V_{sense} = gCV_{drive} \text{ wherein g is a constant.} \quad \text{equ. 5)}$$

Figure 6:
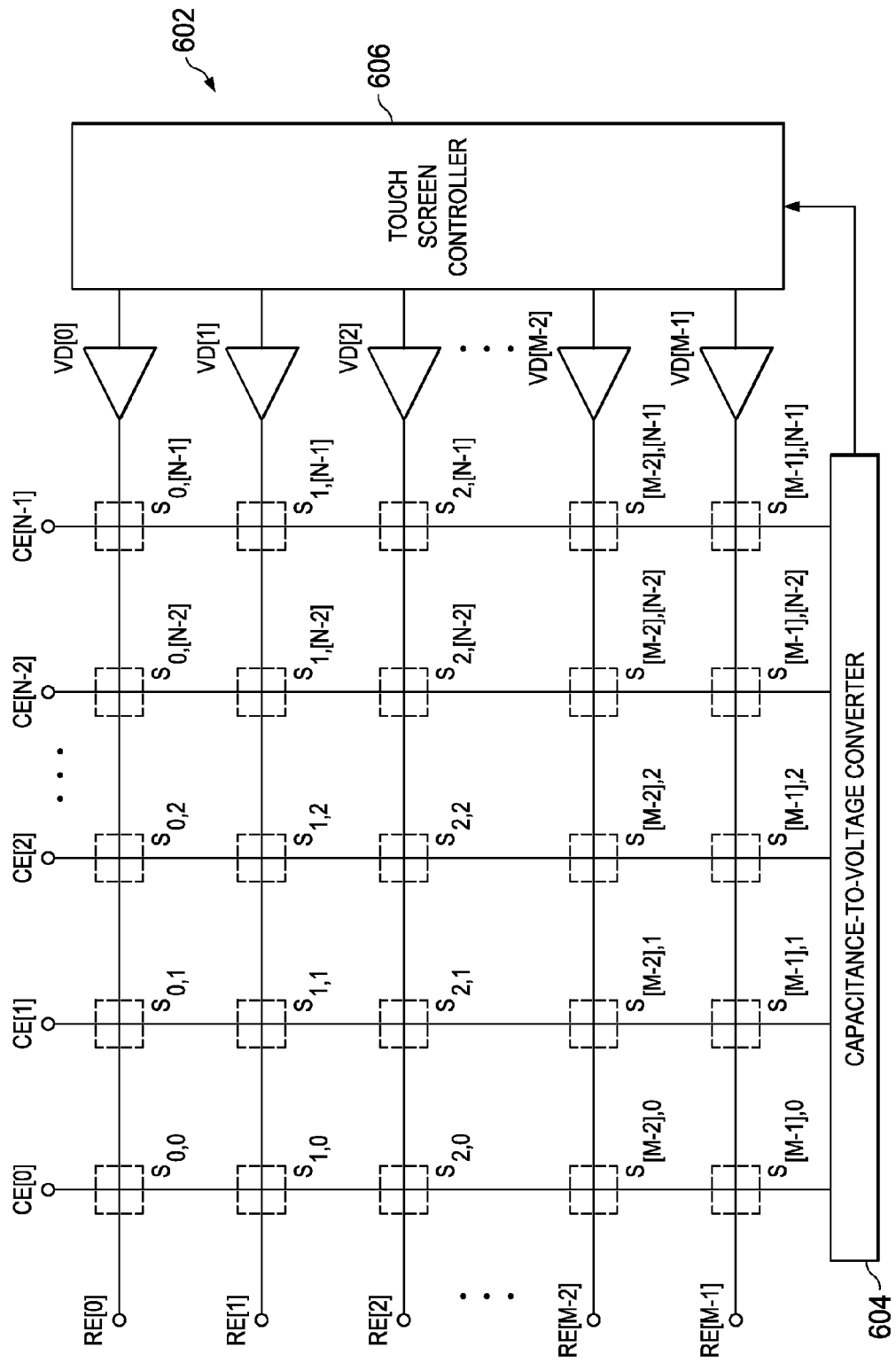
FIG. 6 is a schematic drawing of an apparatus for determining the location(s) of objects making contact with a capacitive-touch screen. (Prior Art)

FIG. 6 is a schematic drawing of an apparatus for determining the location(s) of objects making contact with a capacitive-touch screen 602. In this embodiment, voltage drivers VD[0]-VD[M−1] drive each sensor S in an individual column n selected from columns C[0]-CE[N−1] to a distinctive voltage during a pre-charge stage through row electrodes RE[0]-RE[M−1]. In this embodiment, each sensor S in a column n is charged by driving the row electrodes RE[0]-RE[M−1] to a positive voltage $V_{drive}$ while the column electrodes C[0]-CE[N−1] are grounded. However, in other embodiments the column electrodes C[0]-CE[N−1] may be driven to non-zero voltages.

In the transfer stage, all the sensors of the selected column n are connected in parallel and the charge accumulated over all the sensors in the selected column n is transferred onto a reference capacitor $C_{ref}$ to induce a sensed voltage $V_{sense}$. The capacitance-to-voltage converter 604 may use the techniques shown in FIGS. 4a-4c, FIG. 5 or other techniques known in the art to convert the capacitance to the sensed voltage $V_{sense}$. The sensed voltage $V_{sense}$ is stored in the touch-screen controller 606 where it is used later.

The pre-charge stage and the transfer stage are repeated K times, each time with a distinctive set of voltages. The driving voltage at row m for column n during the k-th (k=0, 1, 2 ... K−1) pre-charge stage is $V_{m,n}^k$. The sensed voltage is equal to:

$$v_n^k = gQ = g \sum_{m=1}^{M} C_{m,n} V_{m,n}^k. \quad \text{equ. 6)}$$

where g is a constant, Q is the total charge and $C_{m,n}$ is the node capacitance of a sensor S at the intersection of row m (m=0, ..., M−1) and column n. After the pre-charge stage and transfer stage have been repeated K times, the K stored voltage measurements can be combined into the following linear equation:

$$\begin{bmatrix} v_n^0 \\ \vdots \\ v_n^{K-1} \end{bmatrix} = g \begin{bmatrix} V_{0,n}^0 & \cdots & V_{M-1,n}^0 \\ \vdots & \ddots & \vdots \\ V_{0,n}^{K-1} & \cdots & V_{M-1,n}^{K-1} \end{bmatrix} \begin{bmatrix} C_{0,n} \\ \vdots \\ C_{M-1,n} \end{bmatrix}. \quad \text{equ. 7)}$$

Equation 7) above may be written in matrix form (ignoring the proportionality constant g) and given below by the following equation:

$$v_n = \Phi_n C_n; \quad \text{equ. 8)}$$

with the following definitions for the following vectors:

$$v_n = [v_n^0 \ldots v_n^{K-1}]^T,$$

$$C_n = [C_{0,n} \ldots C_{M-1,n}]^T,$$

and the pre-charge matrix:

$$\Phi_n = \begin{bmatrix} V_{0,n}^0 & \cdots & V_{M-1,n}^0 \\ \vdots & \ddots & \vdots \\ V_{0,n}^{K-1} & \cdots & V_{M-1,n}^{K-1} \end{bmatrix}.$$

Generally speaking, it is impossible to uniquely recover $C_n$ (the capacitance on a sensor) from $V_n$ if K<M due to the system of equations being under-determined. However, when the solution is sparse, $C_n$ can be uniquely resolved using sparse-activation compressive sensing. In order for the solution to be sparse, the number of touches on the screen must be substantially smaller than the number of sensors (nodes) on the screen. This assumption may also be extended to each column of sensors when only a small number of sensors on each column are touched simultaneously.

When contact is made with a capacitive-touch screen, the capacitance $C_n$ changes. As previously discussed, contact with a capacitive-touch screen creates a capacitance $\Delta C_n$ in parallel with the parasitic capacitance $\overline{C}_n$ of the sensor S. Therefore the change in capacitance of a sensor is given by:

$$\Delta c_n = c_n - \overline{c}_n, \qquad \text{Equ. 9)}$$

Where the parasitic capacitance of a column n is given by:

$$\overline{c}_n = [\overline{C}_{0,n} \ldots \overline{C}_{M-1,n}]^T, \qquad \text{Equ. 10)}$$

$\Delta C_n$, is sparse because there are only a small number of non-zero entries in $\Delta C_n$ (i.e. very few sensors are touched so there are very few changes in capacitance in sensors relative to the number of sensors on a capacitive-touch screen). Combining equations 8) with equation 9), rearranging terms and defining $v_n^c$ as the calibrated voltage measurements for column n the following equation is obtained:

$$v_n^c = v_n - \Phi_n \overline{c}_n = \Phi_n \Delta c_n \qquad \text{Equ. 11)}$$

for the case of perfect calibration and $$v_n^c = \Phi_n \Delta c_n + e_n \qquad \text{Equ. 12)}$$

for the case of calibration error $e_n$.

The change in capacitance $\Delta C_n$ of sensors in a column can be determined from equation 12 using sparse-activation compressive sensing. For example, when $\Phi_n$ is a random Gaussian or Bernoulli matrix and $\Delta C_n$ has a sparsity of s, with K=O (s*log(M/s) (O means "Order of",—it's a measure of complexity), the change in $\Delta C_n$ can be uniquely recovered by solving the following equation:

$$\min \|\Delta c_n\|_1$$

such that $$\|v_n^c - \Phi_n \Delta c_n\|_2 \leq \in, \qquad \text{Equ. 13)}$$

where $\in$ is a bound for the calibration error.

In practice, it may be difficult or costly to implement $\Phi_n$ as a random Gaussian or Bernoulli matrix. Toeplitz or circulant matrices may also be used to implement $\Phi_n$. Moreover, Toeplitz and circulant matrices may be more easily realized in hardware circuits (e.g. by performing a circular convolution with a random sequence. Toeplitz and circulant matrices may also allow faster decoding.

Figure 7:
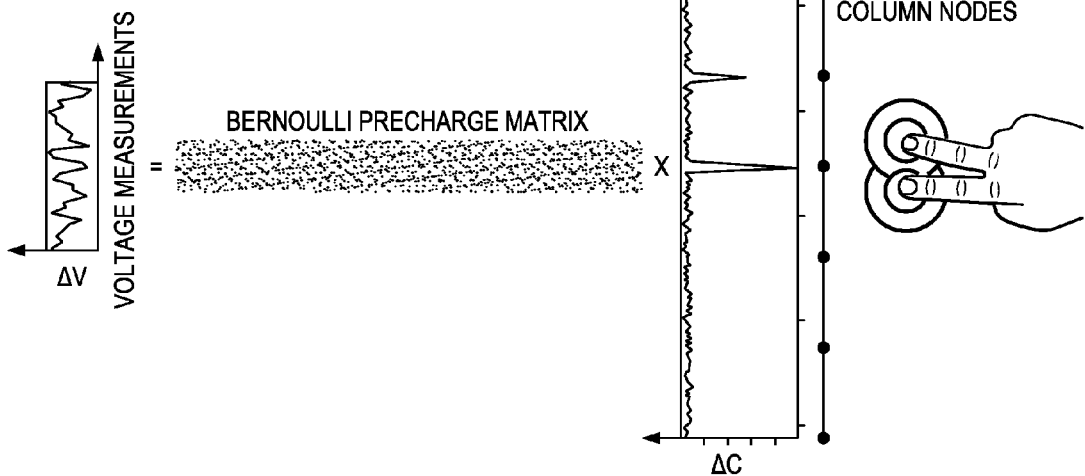
FIG. 7 illustrates a large sensor spacing topology according to an embodiment of the invention.
Figure 8:
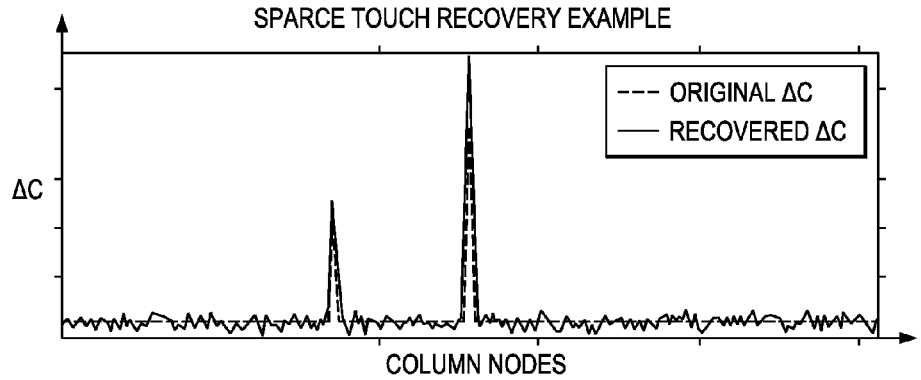
FIG. 8 illustrates recovery of the change in capacitance with a large sensor spacing topology according to an embodiment of the invention.

In the case where the distance between each sensor (node) is much larger than the size of touching objects (e.g. fingers), a touch object could only induce capacitance changes in sensors in close vicinity of the touch. For this case $C_n$ is sparse and can be recovered according to equation 13. FIG. 7 illustrates a large sensor spacing topology according to an embodiment of the invention. Each entry in the pre-charge matrix $\Phi_n$ follows a random Bernoulli distribution such that each sensor (node) is randomly charged with {+V, −V} voltages. FIG. 8 illustrates recovery of the change in capacitance $\Delta C_n$ with a large sensor spacing topology according to an embodiment of the invention. In this example the compression ratio (WIC) is 8:1 (i.e. M=256 and K=32).

In the case where the distance between each node is small compared with the size of the touching object, multiple sensors are influenced by a single touch and $\Delta C_n$ is not sparse in its current form. To find a solution for this case, a sparsifying basis $\psi$ is needed such that the projection $\alpha_n$ of $\Delta C_n$ under $\psi$ is sparse. Modifying the recovery algorithm in equation 13 to include the sparsifying basis $\psi$ provides the following:

$$\min \|\alpha_n\|_1$$

such that $$\|v_n^c - \Phi_n \psi \alpha_n\|_2 \leq \in \Delta c_n = \psi \alpha_n. \qquad \text{equ. 14)}$$

Figure 9:
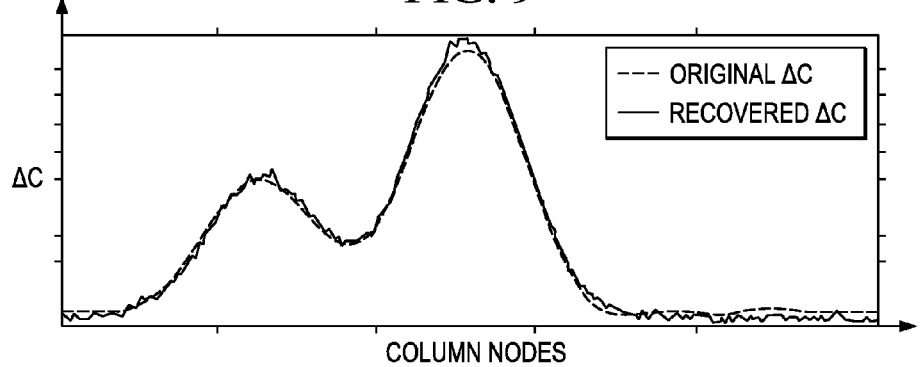
FIG. 9 illustrates recovery of the change in capacitance with a small sensor spacing topology according to an embodiment of the invention.

FIG. 9 illustrates recovery of the change in capacitance with a small sensor spacing topology according to an embodiment of the invention. The embodiment show in FIG. 9 uses a DFT (discrete Fourier transform) matrix as the sparsifying matrix $\psi$. In this example the compression ratio (M/K) is 8:1 (i.e. M=256 and K=32).

For other embodiments of the invention, other sparsifying basis $\psi$ may be used. For example DFT, DCT (discrete cosine transform), wavelet (a wavelet is a wave-like oscillation with an amplitude that starts out at zero, increases, and then decreases back to zero), curvelet (curvelets are a non-adaptive technique for multi-scale object representation) may be used as a sparsifying basis $\psi$. When the sparsifying basis $\psi$ is determined, the pre-charge matrix $\Phi_n$ can be further optimized to minimize the mutual coherence between $\Phi_n$ and $\psi$. As a result, the number of minimally required measurements may be further reduced.

In general, two classes of algorithms may be used to solve the constrained optimization problems in equations 13) and 14). For equation 13), linear/convex optimization may be used. For equation 14) greedy algorithms may be used. Greedy algorithms are often used for hardware realization due to their computational simplicity. For this specific problem, two additional characteristics of $\Delta C_n$ can be taken advantage of. First, the non-negative assumption of $\Delta C_n$ leads to a variant of the matching pursuit algorithm that is guaranteed to find a sparse solution when $\Phi_n$ is properly designed. Second, for small to medium sensor spacing topologies, the non-zero entries in $\Delta C_n$ are clustered in the vicinity of the touch points instead of sporadically. Model-based compressive sensing theory may be applied to enhance the recovery algorithm according to this block-wise sparsity characteristic.

The column-wise compressive sparse touch shown in FIG. 6 can be extended to a grid sensing scheme. In a grid sensing scheme, all sensors (nodes) $S_{[0,0]}$-$S_{[M-1],[N-1]}$ on the capacitive-touch screen 602 are driven by voltage drivers VD[0]-VD[M−1] to a distinct voltage during the pre-charge stage. During the transfer stage, all sensors $S_{[0,0]}$-$S_{[M-1],[N-1]}$ are connected in parallel such the changes accumulated over each individual sensor are mixed together and transferred onto a reference capacitor $C_{ref}$ to derive a sensed voltage $V_{sense}$. The pre-charge stage and the transfer stage are repeated K times, similar to the column-wise compressive sparse touch embodiment, such that the change in capacitance $\Delta c$ on the sensors due to contact being made with the capacitive-touch screen is determined.

The grid sensing scheme is able to take further advantage of the relative sparsity of active contact made with the capacitive-touch screen 602 compared with the total number of sensors $S_{[0,0]}$-$S_{[M-1],[N-1]}$. Therefore, the total number of measurements is minimized given the same maximum active touch points assumption discussed previously.

Figure 10:
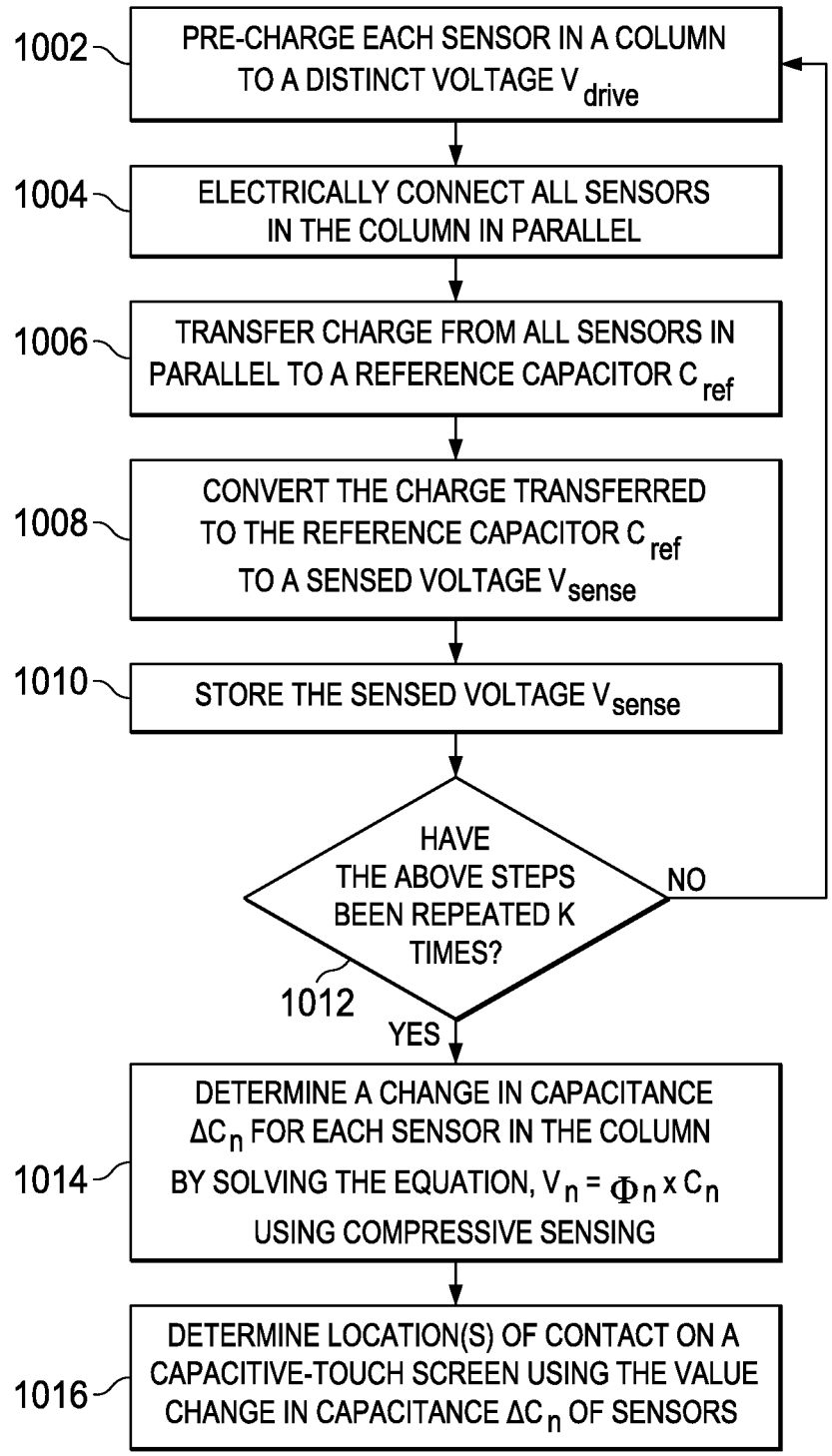
FIG. 10 is a flow chart illustrating a method of determining the location(s) of contact made with a capacitance touch screen according to an embodiment of the invention.

FIG. 10 is a flow chart illustrating a method of determining the location(s) of contact made with a capacitance touch screen according to an embodiment of the invention. During step 1002, each sensor in a column is pre-charged to a distinct voltage Vdrive by voltage drivers VD[0]-VD[M−1]. After the sensors in the column have been pre-charge to a distinct voltage Vdrive, the sensors are electrically connected in parallel as shown in step 1004. During step 1006, charge from all the sensors (node) that are connected in parallel is transferred to a reference capacitor $C_{ref}$. During step 1008, the charge on the capacitor $C_{ref}$ is converted to a sensed voltage, $V_{sense}$. The sensed voltage $V_{sense}$ is stored in a touch-screen controller 606 during step 1010.

When steps 1002-1010 are repeated K (the value of K is substantially smaller than the number of sensors in a column) times, step 1012 proceeds to step 1014. When steps 1002-1010 have not been repeated K times, step 1002 is started again. During step 1014, a value for the change in capacitance $\Delta C_n$ is determined by solving equation 8) using compressing sensing. The location(s) where contact is made with the capacitive-touch screen is determined using the non-zero value change in capacitance $\Delta C_n$ of the sensors during step 1016.

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A non-transitory machine-implemented method of determining where activated capacitance sensors are located on a capacitive-touch interactive screen comprising:
   a first step, the first step comprising:
      precharging each capacitance sensor in a group of N capacitance sensors to a distinct voltage $V_n$;
      electrically connecting all N capacitance sensors in parallel;
      transferring charge from all N sensors connected in parallel to a reference capacitor $C_{ref}$;
      converting the charge transferred to the reference capacitor $C_{ref}$ to a sensed voltage $V_{sense}$; wherein the sensed voltage $V_{sense}$ equals a single state; storing the single state;
   a second step, the second step comprising:
      repeating the first step K times; wherein the value of K is substantially less than the number of sensors N;
   a third step, the third step comprising:
      determining a capacitance $C_n$ for each capacitance sensor in the column of N capacitance sensors by solving an equation using sparse-activation compressive sensing, the equation given by:

$$v_n = \Phi_n c_n$$

wherein $$\Phi_n = \begin{bmatrix} V_{0,n}^0 & \cdots & V_{M-1,n}^0 \\ \vdots & \ddots & \vdots \\ V_{0,n}^{K-1} & \cdots & V_{M-1,n}^{K-1} \end{bmatrix}$$

$$c_n = [\, C_{0,n} \; \cdots \; C_{M-1,n} \,]^T$$

$$v_n = [\, v_n^0 \; \cdots \; v_n^{K-1} \,]^T$$

wherein $C_{m,n}$ is the node capacitance of a capacitance sensor at the intersection of row m and column n; wherein m=(0, 1. . . , M−1);
wherein an activated capacitance sensor on the capacitive-touch interactive screen is located where the capacitance $C_{m,n}$ of sensor (s) is different from the capacitance of capacitance sensors that are not activated on the capacitive-touch interactive screen.

2. The non-transitory machine-implemented method of determining where activated capacitance sensors are located on the capacitive-touch interactive screen of claim 1 wherein parasitic capacitance of the N sensors in the column is given by:

$$\bar{c}_n = [\overline{C}_{0,n} \ldots \overline{C}_{M-1,n}]^T$$

wherein change in capacitance at a sensor is given by:

$$\Delta c_n = c_n - \bar{c}_n$$

wherein the number of non-zero values for $\Delta C_n$ is substantially fewer than the number of N sensors;
wherein a calibrated voltage $v_n^c$ is equal to:

$$v_n^c = \Phi_n \Delta c_n + e_n$$

wherein $e_n$ is calibration error;
wherein $\Delta C_n$ is determined by solving the following equation:

$$\min \|\Delta c_n\|$$

such that $$\|v_n^c - \Phi_n \Delta c_n\| \leq \epsilon$$

wherein $\Delta C_n$ has a sparsity s with K=O(s*log(M/s)).

* * * * *